United States Patent
Sethi et al.

(10) Patent No.: US 12,093,744 B2
(45) Date of Patent: Sep. 17, 2024

(54) SYSTEM AND METHOD FOR INSTANTIATING TWIN APPLICATIONS

(71) Applicant: Dell Products L.P., Round Rock, TX (US)

(72) Inventors: Parminder Singh Sethi, Punjab (IN); Lakshmi Saroja Nalam, Bangalore (IN); Madhuri Dwarakanath, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/159,258

(22) Filed: Jan. 25, 2023

(65) Prior Publication Data
US 2024/0248768 A1  Jul. 25, 2024

(51) Int. Cl.
G06F 9/50 (2006.01)

(52) U.S. Cl.
CPC .......... *G06F 9/5072* (2013.01); *G06F 9/5077* (2013.01)

(58) Field of Classification Search
CPC .............................. G06F 9/5072; G06F 9/5077
See application file for complete search history.

(56) References Cited

U.S. PATENT DOCUMENTS

| | | |
|---|---|---|
| 6,195,760 B1 | 2/2001 | Chung et al. |
| 7,251,745 B2 | 7/2007 | Koch et al. |
| 7,401,248 B2 | 7/2008 | Nakahara et al. |
| 7,525,749 B2 | 4/2009 | Maejima et al. |
| 7,590,981 B2 | 9/2009 | Gupta et al. |
| 8,078,448 B1 | 12/2011 | Wohlberg et al. |
| 8,364,799 B2 | 1/2013 | Sakai |
| 8,918,673 B1 | 12/2014 | Rangaiah et al. |
| 11,595,269 B1 | 2/2023 | Ghosh et al. |
| 11,846,918 B1 * | 12/2023 | Mazur ................ G05B 19/4186 |

(Continued)

FOREIGN PATENT DOCUMENTS

JP  2017027496 A  *  2/2017  ............... G06F 9/46

(Continued)

OTHER PUBLICATIONS

Okuda et al., "Migration system and method for container", JP 2017027496 A (Eng), Feb. 2, 2017, 13 Pages. (Year: 2017).*

(Continued)

*Primary Examiner* — Brian J. Gillis
*Assistant Examiner* — Chhian (Amy) Ling
(74) *Attorney, Agent, or Firm* — Chamberlain, Hrdlicka, White, Williams & Aughtry; Aly Z. Dossa

(57) ABSTRACT

A method includes identifying relationships between containers on a first device, where each container includes at least one relationship that includes a HAS-A relationship or an IS-A relationship. The method also includes creating, on a second device, a first set of twin containers, where each container in the first set of twin containers corresponds to a container that includes only the HAS-A relationships. In addition, the method includes creating, on the second device and in response to creating the first set of twin containers, a second set of twin containers where each container in the second set of twin containers corresponds to a container that includes at least one IS-A relationship. Moreover, the method includes determining and performing a twin container start-up sequence for the first set and the second set of twin containers.

20 Claims, 9 Drawing Sheets

(56) References Cited

U.S. PATENT DOCUMENTS

| | | |
|---|---|---|
| 2005/0216800 A1 | 9/2005 | Bicknell et al. |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2008/0222218 A1 | 9/2008 | Richards et al. |
| 2009/0307522 A1 | 12/2009 | Olson et al. |
| 2011/0113224 A1 | 5/2011 | Isshiki et al. |
| 2012/0072571 A1 | 3/2012 | Orzell et al. |
| 2013/0103977 A1 | 4/2013 | Zimmermann |
| 2013/0246623 A1* | 9/2013 | Seth .................. H04L 47/783 709/226 |
| 2014/0376385 A1 | 12/2014 | Boss et al. |
| 2015/0261518 A1 | 9/2015 | Viswanathan |
| 2015/0278219 A1 | 10/2015 | Phipps |
| 2016/0162280 A1 | 6/2016 | Murayama et al. |
| 2016/0239395 A1 | 8/2016 | Madsen et al. |
| 2018/0113728 A1 | 4/2018 | Musani et al. |
| 2018/0262979 A1 | 9/2018 | Wang et al. |
| 2019/0199687 A1* | 6/2019 | Lan ........................ G06F 21/53 |
| 2019/0310872 A1* | 10/2019 | Griffin ...................... G06F 8/71 |
| 2019/0386849 A1* | 12/2019 | Yu ........................ H04W 36/026 |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0264930 A1 | 8/2020 | Mandagere et al. |
| 2021/0165768 A1 | 6/2021 | D'halluin et al. |
| 2022/0075613 A1 | 3/2022 | Ramachandran |
| 2022/0164186 A1 | 5/2022 | Pamidala |
| 2022/0179683 A1 | 6/2022 | Verma et al. |
| 2023/0037124 A1 | 2/2023 | Mengwasser et al. |
| 2023/0080047 A1 | 3/2023 | Bashir |

OTHER PUBLICATIONS

Wu, Suzhen et al., "Proactive Data Migration for Improved Storage Availability in Large-Scale Data Centers", IEEE Transactions on Computers, vol. 64, No. 9, Sep. 2015.

* cited by examiner

SYSTEM AND METHOD FOR INSTANTIATING TWIN APPLICATIONS

BACKGROUND

Computing devices often exist in environments that include many such devices (e.g., servers, containerized environments, virtualization environments, storage devices, network devices, etc.). Such environments may, from time to time, in whole or in part, require being twinned and/or migrated (e.g., moved from one set of devices to another). Such twinning and/or migrations often require large amounts of investigation, coordination, time, and manual steps to be performed by any number of system administrators.

SUMMARY

In general, embodiments described herein relate to a method for managing containers. The method includes identifying relationships between containers on a first device, where each container includes at least one relationship that includes a HAS-A relationship or an IS-A relationship. The method also includes creating, on a second device, a first set of twin containers, where each container in the first set of twin containers corresponds to a container that includes only the HAS-A relationships. In addition, the method includes creating, on the second device and in response to creating the first set of twin containers, a second set of twin containers where each container in the second set of twin containers corresponds to a container that includes at least one IS-A relationship. Moreover, the method includes determining and performing a twin container start-up sequence for the first set and the second set of twin containers.

In general, embodiments described herein relate to a non-transitory computer readable medium comprising computer readable program code. The computer readable code, which when executed by a computer processor, enables the computer processor to perform a method for managing containers. The method includes identifying relationships between containers on a first device, where each container includes at least one relationship that includes a HAS-A relationship or an IS-A relationship. The method also includes creating, on a second device, a first set of twin containers, where each container in the first set of twin containers corresponds to a container that includes only the HAS-A relationships. In addition, the method includes creating, on the second device and in response to creating the first set of twin containers, a second set of twin containers where each container in the second set of twin containers corresponds to a container that includes at least one IS-A relationship. Moreover, the method includes determining and performing a twin container start-up sequence for the first set and the second set of twin containers.

In general, embodiments described herein relate to a method for managing containers. The method includes identifying relationships between containers on a first device, where each container includes at least one relationship that includes a HAS-A relationship or an IS-A relationship. The method also includes generating a relationship matrix based on the relationships. Further, the method includes creating, on a second device, a set of twin containers corresponding to the containers on the first device. In addition, the method includes determining and performing a twin container start-up sequence for the set of twin containers.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
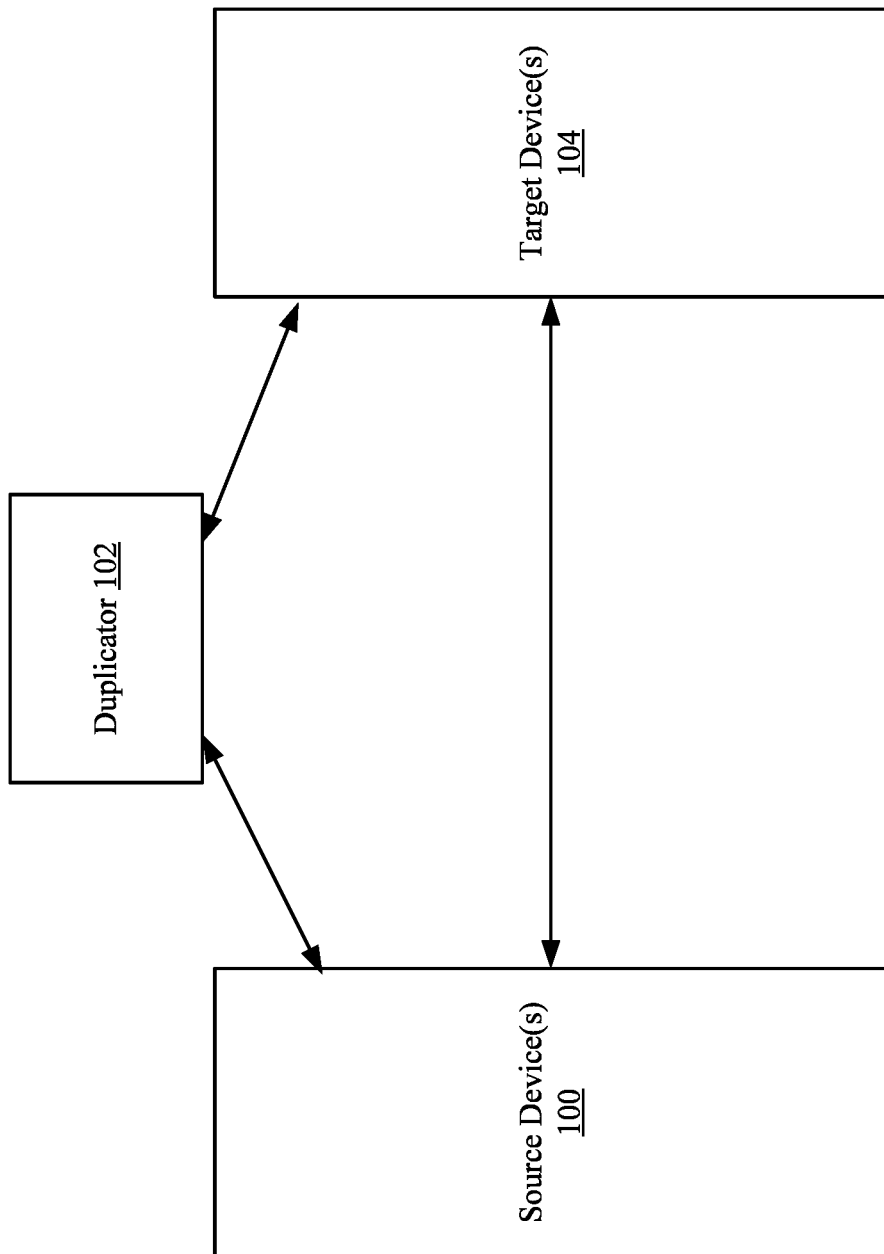
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for creating and executing duplication workflows to twin or migrate data from one device or set of devices to another device or set of devices (e.g., from one computing environment to another). In one or more embodiments, duplications involve obtaining relationship information with regards to the containers that will be duplicated from one device to another device or set of devices.

In one or more embodiments, relationship information for the containers being duplicated (e.g., twinned or migrated) is obtained. The containers are classified based on their relationships such as HAS-A (two or more applications have a correlated relationship with each other), IS-A (two or more applications have a dependency relationship, such as being parent and/or a child application), or independent. Based on these classifications, one or more embodiments of the invention generate a relationship matrix in order to assign priority to the duplication of each individual container. The containers are then duplicated based on the matrix and assigned priorities.

FIG. 1A shows a diagram of a system in accordance with one or more embodiments described herein. The system may include any number of source devices (100), and any number of target devices (104). The system may also include a duplicator (102) operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment. Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multilayer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices (e.g., 100, 102, 104) may form all or a portion of a data domain, all, or part of which may require being duplicated (e.g., twinned or duplicated) from time to time (e.g., upon request and/or pursuant to a defined schedule). In one or more embodiments, a data domain is any set of computing devices (100) for which duplication services are performed.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes the duplicator (102). In one or more embodiments, the duplicator (102) is operatively connected to both the source devices (100) and the target devices (104). The duplicator (102) may be located within a source environment, within a target environment, or separate from and connected to both environments. In one or more embodiments, the duplicator (102) is a computing device. In one or more embodiments, duplicator (102) is any device, portion of a computing device (as described above), or any set of computing devices (as described above) capable of electronically processing instructions.

In one or more embodiments, the source devices (100), the duplicator (102), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular network, or any other suitable network that facilitates the exchange of information from one part of the network to another. A network may be located at a single physical location or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
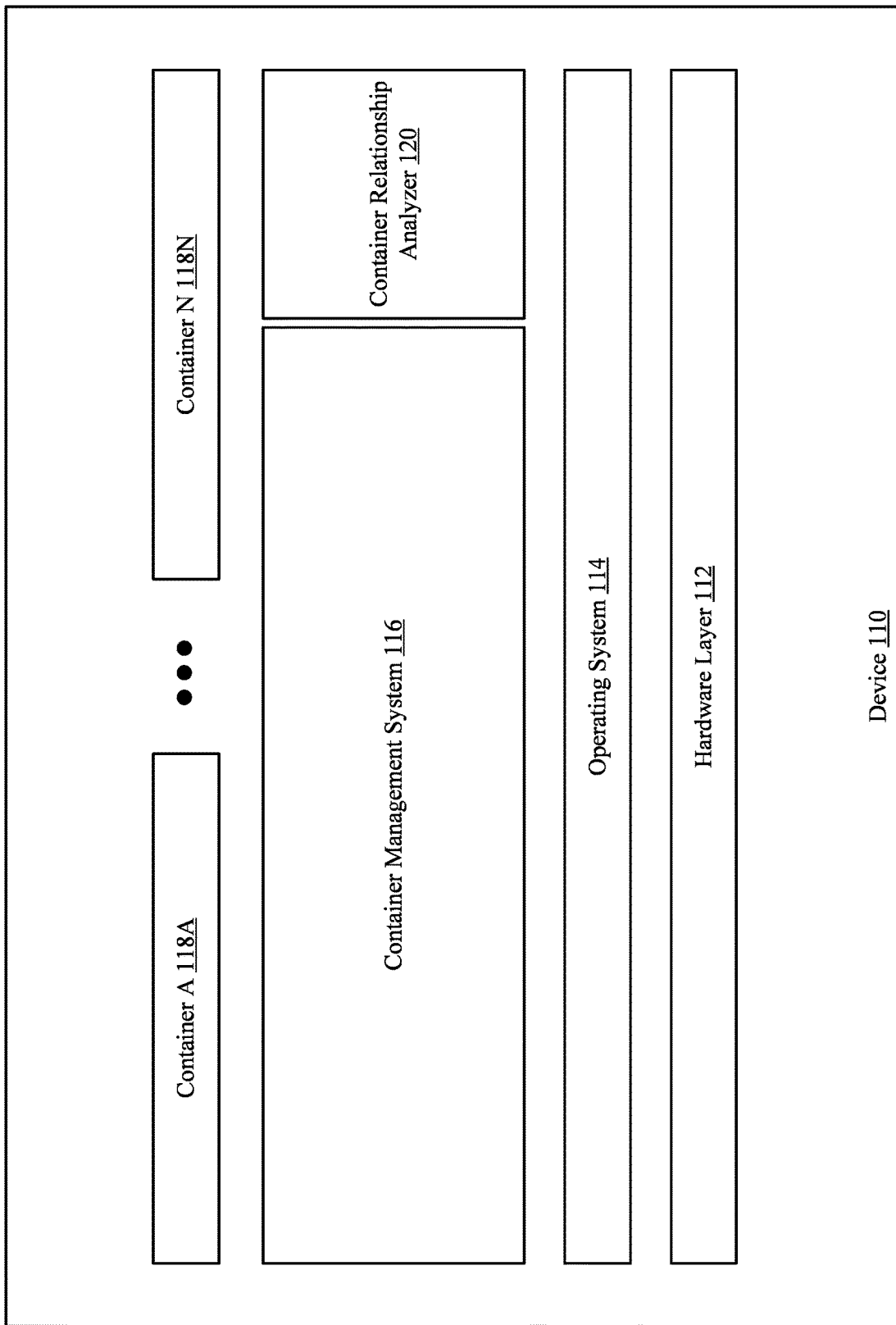
FIG. 1B shows a diagram of a device in accordance with one or more embodiments of the invention.

FIG. 1B shows a diagram of a device (110) in accordance with one or more embodiments described herein. The device (110) may correspond to a source device (100) and/or target device (104) and includes a hardware layer (112), an operating system (OS) (114), a container management system (CMS) (116), a number of containers (118A-118N), and a container relationship analyzer (120). Each of these components is described below.

In one or more embodiments of the invention, the hardware layer (112) is a collection of physical components configured to perform the operations of the device (110) and/or otherwise execute the software of the device (110) (e.g., those of the containers (118A-118N).

In one embodiment of the invention, the hardware layer (112) includes one or more communication interface(s). In one embodiment of the invention, a communication interface is a hardware component that provides capabilities to interface the device (110) with one or more other devices and allow for the transmission and receipt of data (including metadata) with those device(s). A communication interface may communicate via any suitable form of wired interface (e.g., Ethernet, fiber optic, serial communication etc.) and/or wireless interface and utilize one or more protocols for the transmission and receipt of data (e.g., Transmission Control Protocol (TCP)/Internet Protocol (IP), Remote Direct Memory Access, IEEE 801.11, etc.).

In one embodiment of the invention, the communication interface may implement and/or support one or more protocols to enable the communication between the device (110) with one or more other devices (e.g., other nodes in the computer and storage infrastructure (CSI), one or more clients, etc.). For example, the communication interface may enable the client application node to be operatively connected, via Ethernet, using a TCP/IP protocol to form a "network fabric" and enable the communication of data between the client application node and other external entities. In one or more embodiments of the invention, each node within the CSI may be given a unique identifier (e.g., an IP address) to be used when utilizing one or more protocols.

Further, in one embodiment of the invention, the communication interface, when using certain a protocol or variant thereof, supports streamlined access to storage media of other devices in the CSI. For example, when utilizing remote direct memory access (RDMA) to access data on another device in the CSI, it may not be necessary to interact with the software (or storage stack) of that other node in the CSI. Rather, when using RDMA, it may be possible for the client application node to interact only with the hardware elements of the other node to retrieve and/or transmit data, thereby avoiding any higher-level processing by the software executing on that other node. In other embodiments of the invention, the communicate interface enables direct communication with the storage media of other nodes using Non-Volatile Memory Express (NVMe) over Fabric (NVMe-oF) and/or persistent memory over Fabric (PMEMoF) (both of which may (or may not) utilize all or a portion of the functionality provided by RDMA).

In one embodiment of the invention, the hardware layer (112) includes one or more processor(s) (not shown). In one embodiment of the invention, a processor may be an integrated circuit(s) for processing instructions (e.g., those of the containers (118A-118N) and/or those received via a communication interface). In one embodiment of the invention, processor(s) may be one or more processor cores or processor micro-cores. Further, in one or more embodiments of the invention, one or more processor(s) may include a cache (not shown) (as described).

In one or more embodiments of the invention, the hardware layer (112) includes persistent storage. In one embodiment of the invention, persistent storage may be one or more hardware devices capable of storing digital information (e.g., data) in a non-transitory medium. Further, in one embodiment of the invention, when accessing persistent storage, other components of the device (110) are capable of only reading and writing data in fixed-length data segments (e.g., "blocks") that are larger than the smallest units of data normally accessible (e.g., "bytes").

Specifically, in one or more embodiments of the invention, when data is read from persistent storage, all blocks that include the requested bytes of data (some of which may include other, non-requested bytes of data) must be copied to other byte-accessible storage (e.g., memory). Then, only after the data is located in the other medium, may the requested data be manipulated at "byte-level" before being recompiled into blocks and copied back to the persistent storage.

Accordingly, as used herein, "persistent storage", "persistent storage device", "block storage", "block device", and "block storage device" refer to hardware storage devices that are capable of being accessed only at a "block-level" regardless of whether that device is volatile, non-volatile, persistent, non-persistent, sequential access, random access, solid-state, or disk based. Further, as used herein, the term "block semantics" refers to the methods and commands software employs to access persistent storage.

Examples of "persistent storage" include, but are not limited to, certain integrated circuit storage devices (e.g., solid-state drive (SSD), magnetic storage (e.g., hard disk drive (HDD), floppy disk, tape, diskette, etc.), or optical media (e.g., compact disc (CD), digital versatile disc (DVD), NVMe devices, computational storage, etc.). In one embodiment of the invention, NVMe device is a persistent storage that includes SSD that is accessed using the NVMe® specification (which defines how applications communicate with SSD via a peripheral component interconnect express) bus. In one embodiment of the invention, computational storage is persistent storage that includes persistent storage media and microprocessors with domain-specific functionality to efficiently perform specific tasks on the data being stored in the storage device such as encryption and compression.

In one or more embodiments of the invention, the hardware layer (112) includes memory. In one embodiment of the invention, memory, similar to persistent storage, may be one or more hardware devices capable of storing digital information (e.g., data) in a non-transitory medium. However, unlike persistent storage, in one or more embodiments of the invention, when accessing memory, other components of the device (110) are capable of reading and writing data at the smallest units of data normally accessible (e.g., "bytes").

Specifically, in one or more embodiments of the invention, memory may include a unique physical address for each byte stored thereon, thereby enabling software (e.g., containers (118A-118N)) to access and manipulate data stored in memory by directing commands to a physical address of memory that is associated with a byte of data (e.g., via a virtual-to-physical address mapping). Accordingly, in one or more embodiments of the invention, software is able to perform direct, "byte-level" manipulation of data stored in memory (unlike persistent storage data, which must first copy "blocks" of data to another, intermediary storage mediums prior to reading and/or manipulating data located thereon).

Accordingly, as used herein, "memory", "memory device", "memory storage", "memory storage device", and "byte storage device" refer to hardware storage devices that are capable of being accessed and/or manipulated at a "byte-level" regardless of whether that device is volatile, non-volatile, persistent, non-persistent, sequential access, random access, solid-state, or disk based. As used herein, the terms "byte semantics" and "memory semantics" refer to the methods and commands software employs to access memory.

Examples of memory include, but are not limited to, certain integrated circuit storage (e.g., flash memory, random access memory (RAM), dynamic RAM (DRAM), resistive RAM (ReRAM), etc.) and Persistent Memory (PMEM). PMEM is a solid-state high-performance byte-addressable memory device that resides on the memory bus, where the location of the PMEM on the memory bus allows PMEM to have DRAM-like access to data, which means that it has nearly the same speed and latency of DRAM and the non-volatility of NAND flash.

In one or more embodiments of the invention, the OS (114) is software executing on the device (110). In one embodiment of the invention, the OS (114) coordinates operations between software executing in "user space" (e.g., containers (118A-118N)) and one or more components of the hardware layer (112) to facilitate the proper use of those hardware layer (112) components.

In one embodiment of the invention, the CMS (116) is a platform for the centralized management and deployment of containers in a network or datacenter. In one embodiment, the CMS (116) may facilitate communication between containers (118A-118N) using, e.g., a bridge network. In one embodiment of the invention, the CMS (116) may include hardware, software, firmware, and any combination thereof. Further, the CMS (116) includes functionality to coordinate with the container relationship analyzer (120) (discussed below), start-up containers, duplicate containers, track the creation and deletion (and therefore manage the deployment) of containers in the device (110), generate, manage, update, and store a container-server table, and any other management activities related to the containers (118A-118N). Further, in one embodiment of the invention, the CMS (116) includes functionality to accept subscription requests from entities that want to receive publication (i.e., notification) of any changes to, updates of, or duplication of containers in a network or datacenter managed by the CMS.

In one embodiment of the invention, the CMS (116) may include a data repository (not shown). The data repository may be any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments, the CMS (116) may coordinate with the container relationship analyzer (120) to develop a duplication workflow (discussed below). Once a duplication workflow has been developed for a requested duplication, the entire duplication workflow may be presented to any number of entities that are responsible for the duplication. For example, stakeholders such as data center administrators, network administrators, system administrators, decision makers for an entity in control of a data center, etc. may each have to approve a duplication workflow before a duplication may take place.

In one embodiment of the invention, the container relationship analyzer (120) determines the relationships between the containers (118A-118N) and stores these relationships in a data store (not shown). In one embodiment, when two or more containers (118A-118N) are communicating over the bridge network, the container relationship analyzer (120) may analyze the communications between containers (118A-118N) to determine the relationships between the containers (118A-118N). For example, the container relationship analyzer (120) may determine the relationships by port mapping such as looking at port mapping metadata or the actual system internal traffic on various ports. By analyzing whether traffic on a specific port is outgoing or incoming, the container relationship analyzer (120) can determine when a container is the parent node, and when a container is the child node. For example, the container receiving traffic may be considered the parent node and the container sending traffic may be considered the child node. Further, a container that does not communicate with any other containers may be considered an independent container. The child or dependent container would be considered to have an IS-A relationship with the corresponding parent, and the parent or independent container would be considered to have a HAS-A relationship with the corresponding child or dependent container.

In one embodiment, the container relationship analyzer (120) may determine whether containers (118A-118N) have a correlated relationship, which would be considered a HAS-A relationship between the two correlated containers. In one embodiment, applications hosted on different containers may utilize the same registration ID. When one application on a first container uses a registration ID, it may make that registration ID available for other applications on other containers. Another application on a second container may then use the same registration ID, thereby establishing a connection between the first container and the second container. The container relationship analyzer (120) may determine the establishment of this connection and that the connection is based on using the same registration ID between applications in separate containers. Thus, the container relationship analyzer (120) determines that these two containers are correlated and assigns a HAS-A relationship to each container.

In one or more embodiments, the containers (118A-118N) are isolated, lightweight virtualization mechanisms (or software constructs) that allow for the running of application(s) or an operating system within the container without the overhead of executing a hypervisor. Minimal overhead is generated by containers because: (i) containers share the same operating system kernel with other containers and the underlying host (e.g., device (110)); and (ii) containers (unlike virtual machines) do not need to emulate physical hardware. In one embodiment of the invention, the containers (118A-118N) may be implemented virtually by the CMS (116). In one embodiment of the invention, the containers (118A-118N) may provide a more efficient, faster, and more portable mechanism for managing application development and deployment across a network or datacenter.

Figure 1C:
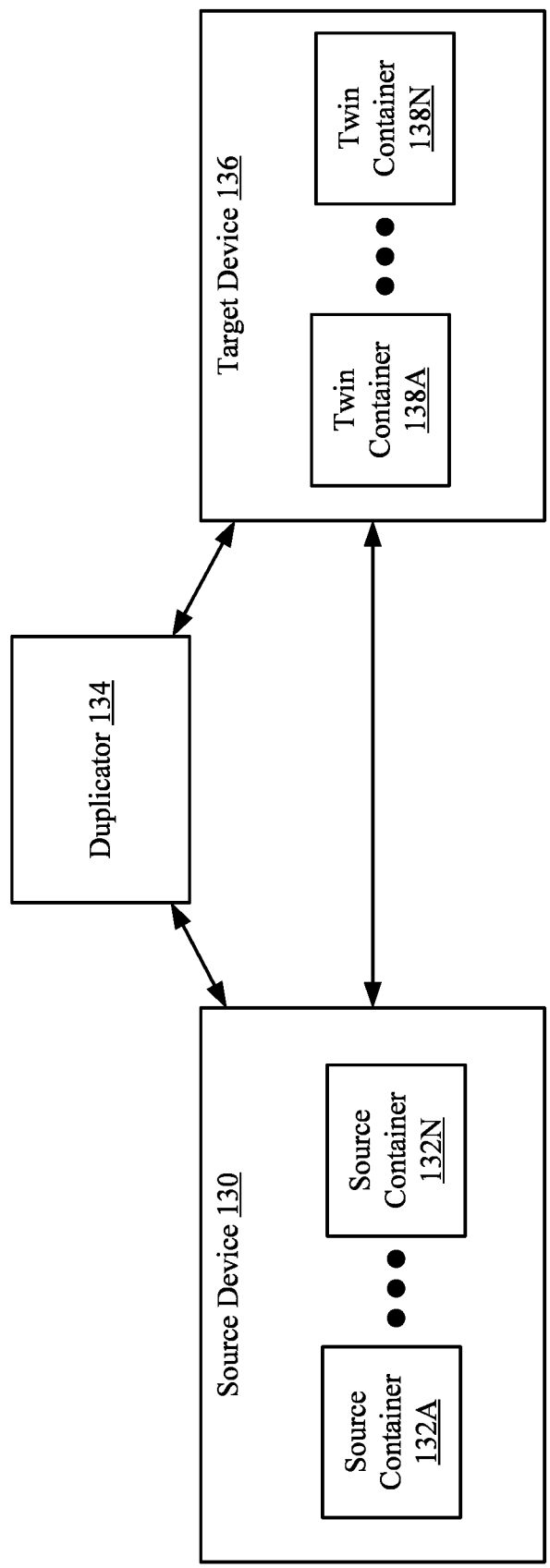
FIG. 1C shows a diagram of twinned containers in accordance with one or more embodiments of the invention.

FIG. 1C shows a diagram of a system of twinned containers in accordance with one or more embodiments described herein. The system may include a source device (130), a target device (136), and a duplicator (134) operatively connected to the source device (130) and to the target device (136). Each of these components is described below.

The source device (130) may be one of the source device(s) (e.g., 100, FIG. 1A) described above. Likewise, the target device may be one of the target device(s) (e.g., 104, FIG. 1A) described above. In one or more embodiments, one or more of the source device (130), the target device (136), and the duplicator (134) may receive a request to twin source containers (132A-132N) located on the source device (130). The request may indicate that twins of the source containers (132A-132N) should be started on the target device (136) to produce twin containers (138A-138N), with each of the twin containers (138A-138N) being a twin to a corresponding one of the source containers (132A-132N). As used herein, a twinned container is one that is identical to its corresponding source container, but runs in a separate environment (e.g., device). Further, any changes made in a source container are also be made in its corresponding twin container. In one or more embodiments, the source containers (132A-132N) may be related to each other in various ways. As such, starting up the twin containers (138A-138N) should be in an order that prevents connection loss between the containers.

Figure 2A:
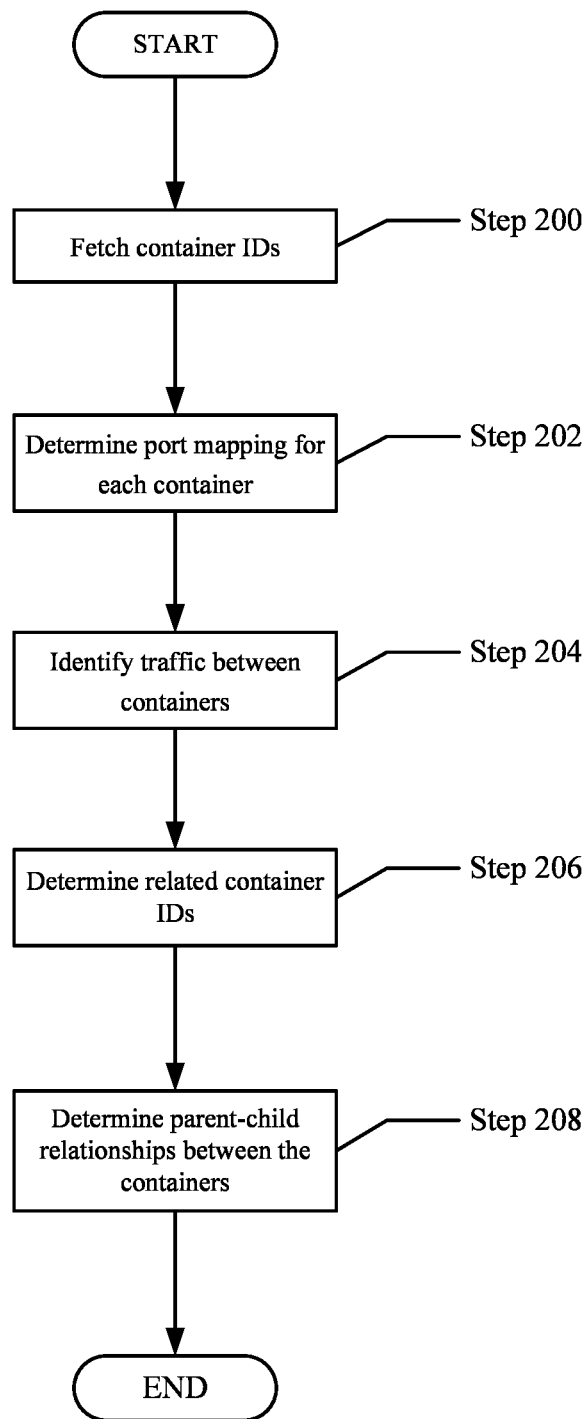
FIG. 2A shows a flowchart of a method to determine relationships between containers in accordance with one or more embodiments of the invention.

FIG. 2A shows a flowchart describing a method for determining a parent-child relationship between at least two containers in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2A shows a flowchart of a method for determining a parent-child relationship between at least two containers, in accordance with one or more embodiments of the invention. This method may be performed on its own, as part of step 302 of the method of FIG. 3, or as part of step 402 of the method of FIG. 4. The method may be performed by, for example, the CMS (e.g., 116, FIG. 1B) in conjunction with the container relationship analyzer (e.g., 120, FIG. 1B) and/or any other part of either the source device (e.g., 100, FIG. 1A) OR target device (e.g., 104, FIG. 1A). Other components of the system illustrated in FIGS. 1A-1B may perform all, or a portion of, the method of FIG. 2A without departing from the invention.

In Step 200, for each container operating in a system, the method fetches the container identification (ID). This may be an ID given to a container by the CMS, the duplicator, a developer, or alternatively an ID that the system uses to identify the specific container.

In Step 202, the method determines the port mapping for each container. As discussed above, the containers may communicate over a network that may be facilitated by the CMS (e.g., 116, FIG. 1). For example, applications running on the containers may communicate through ports on the network. Metadata corresponding to sending and receiving ports may provide a map of ports used for communicating between the containers, which may be used to determine relationships between containers.

In Step 204, the method identifies traffic between the containers. Data travelling from containers is identified by the CMS as incoming traffic. The direction of the traffic (i.e., sending or receiving) may be utilized to determine relationships between containers.

In Step 206, the method identifies all of the container IDs associated with the port mapping metadata and incoming traffic. At this point, the container relationship analyzer (e.g., 120, FIG. 1B) has information regarding the containers that are communicating and how they are communicating.

In Step 208, the method determines the parent-child relationships between the containers. As discussed above, when data travels between containers, one container is receiving traffic and another is sending traffic. Once the sending and receiving of traffic, along with the associated container IDs is determined, the method may determine that the container receiving traffic is a parent container and is assigned a HAS-A relationship. Further, the method may determine that the container sending traffic is a child container and is assigned an IS-A relationship.

Once Step 208 is complete, the method may end.

Figure 2B:
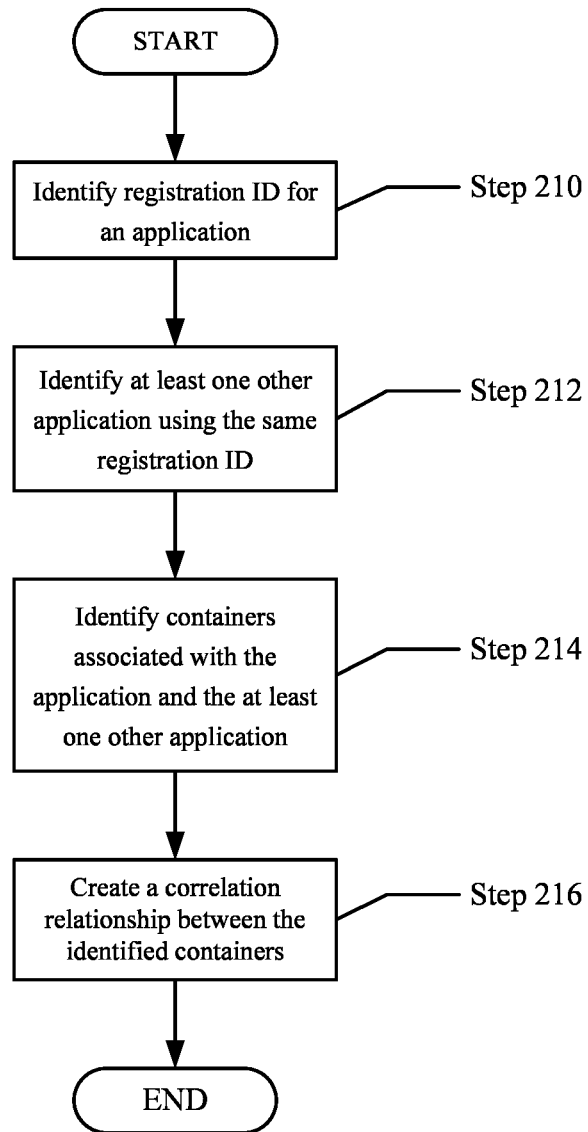
FIG. 2B shows a flowchart of a method to determine relationships between containers in accordance with one or more embodiments of the invention

FIG. 2B shows a flowchart describing a method for determining a correlated relationship between at least two containers in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2B shows a flowchart of a method for determining a correlated relationship between at least two containers, in accordance with one or more embodiments of the invention. This method may be performed on its own, as part of step 302 of the method of FIG. 3, or as part of step 402 of the method of FIG. 4. The method may be performed by, for example, the CMS (e.g., 116, FIG. 1B) in conjunction with the container relationship analyzer (e.g., 120, FIG. 1B) and/or any other part of either the source device (e.g., 100, FIG. 1A) OR target device (e.g., 104, FIG. 1A). Other components of the system illustrated in FIGS. 1A-1B may perform all, or a portion of, the method of FIG. 2B without departing from the invention.

In Step 210, the method identifies a registration ID used for each application along with the container in which the application is running. This ID may be used to provide functionality for the associated application.

In Step 212, the method identifies at least one other application that is using the same registration ID. For example, after an application has registered and received a registration ID, the application may store the registration ID in a location that is available for other applications in separate containers to use the same registration ID. Thus, a second application may use a registration ID that is already in use by another application, which establishes a connection between the applications, and, thus, the containers on which the applications are running.

In Step 214, the method identifies the containers associated with the two applications that are using the same registration ID. Further, it should be appreciated that more than two applications may be using the same registration ID.

In Step 216, the method creates a correlation relationship between the identified containers. This relationship indicates that the two containers may work together in certain circumstances, but each container can function individually as well.

Once Step 216 is complete, the method may end.

Figure 3:
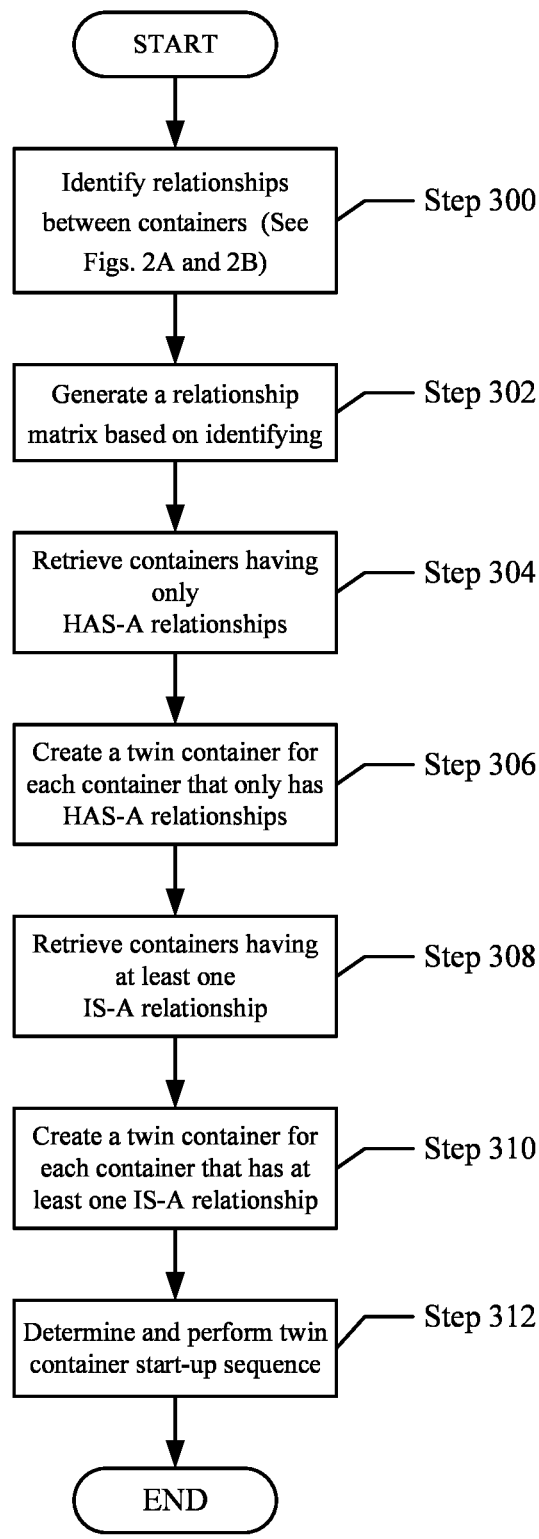
FIG. 3 shows a flowchart of a method to start-up twin containers in accordance with one or more embodiments of the invention.

FIG. 3 shows a flowchart describing a method for twinning one or more containers from a first device to a second device in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 3 shows a flowchart of a method for twinning one or more containers, in accordance with one or more embodiments of the invention. The method may be performed by, for example, the duplicator (102, FIG. 1B) and/or any other part of either the source device (100, FIG. 1A) or target device (104, FIG. 1A). Other components of the system illustrated in FIGS. 1A-1C may perform all, or a portion of the method of FIG. 3 without departing from the invention.

In step 300, the method identifies the relationships between the containers, as discussed in more detail in FIGS. 2A-2B. The methods above identify if at least two containers have a relationship and create the relationship types of HAS-A or IS-A relationships. The identifying the relationships may be in response to a request is received to twin any amount of a source device's containers to a target device.

In step 302, the container relationship analyzer uses this identification of the relationships between the at least two containers to produce a matrix for each container showing its relationship to other containers. The matrix can take the form of a table as shown in the exemplary table below:

TABLE 1

| Container | Relationship | Containers |
|---|---|---|
| C1 | HAS-A | C2, C3, C4 |
| C2 | HAS-A | C1 |
| C3 | HAS-A | C1 |
| C4 | HAS-A; IS-A | C1, C5; C1 |
| C5 | HAS-A | C4 |
| C6 | Independent node | |
| C7 | HAS-A; IS-A | C8; C4 |
| C8 | HAS-A; IS-A | C7; C4 |
| C9 | IS-A | C5 |
| C10 | IS-A | C5 |
| C11 | IS-A | C9 |
| C12 | IS-A | C7, C4 |

TABLE 1-continued

| Container | Relationship | Containers |
|---|---|---|
| C13 | IS-A | C6 |
| C14 | HAS-A; IS-A | C15; C13 |
| C15 | HAS-A | C14 |

In Table 1, the relationships between fifteen different containers (C1-C15) are shown. The target container is listed in the first column. The type of relationship the target container has with other containers is listed in the second column (HAS-A: where two containers are working together, IS-A: where the child container is dependent on the parent container, and Independent: the container is independent of the other containers). The containers that the target container has relationships with are listed in the third column. More than one container can have the same type of relationship with another container. The matrix produced in Step 302 can take other forms such as a database and in one or more embodiments of the invention, it can also be represented in the form of a relationship tree, which is discussed below with regards to the example in FIG. 5.

In Step 304, the method retrieves all of the containers having only HAS-A relationships and containers that are independent. For example, with reference to Table 1, this would include containers C1-C3, C5, C6, and C15.

In Step 306, the method creates a twin container on a target device for each of the containers retrieved in Step 304.

In Step 308, the method retrieves all of the containers having at least one IS-A relationship. For example, with reference to Table 1, this would include containers C4 and C7-C14.

In Step 310, the method creates a twin container for each of the containers retrieved in Step 308.

In Step 312, the method determines and performs the twin container start-up sequence. For example, the twin container start-up sequence may proceed as follows: the twin containers created in Step 306 are started first (but in any order because none of the containers created in Step 306 are dependent on any other container) and then, after all of the twin containers created in Step 306 are started, the twin containers created in Step 310 may be started in an ordered manner.

For example, a check may be performed on the containers retrieved in Step 308 to determine which of those containers include at least one HAS-A relationship. Then, when starting the twin containers in Step 312, the method may start the twin containers corresponding to containers that include HAS-A and IS-A relationships before starting the twin containers corresponding to containers that include only IS-A relationships. Further, before starting a twin container corresponding to a container that includes an IS-A relationship, the method may check that the twin container of the corresponding parent container has already been successfully started.

Further, the twin container start-up sequence may result in the creation of the twin containers one-at-a-time. When creating the twin containers one-at-a-time, the twin container start-up sequence may include waiting a predefined amount of time (e.g., 30 seconds) between creating each twin container. The predefined amount of time may be utilized to check if each twin container was created successfully before creating the next one.

Once Step 312 is complete, the method may end.

Figure 4:
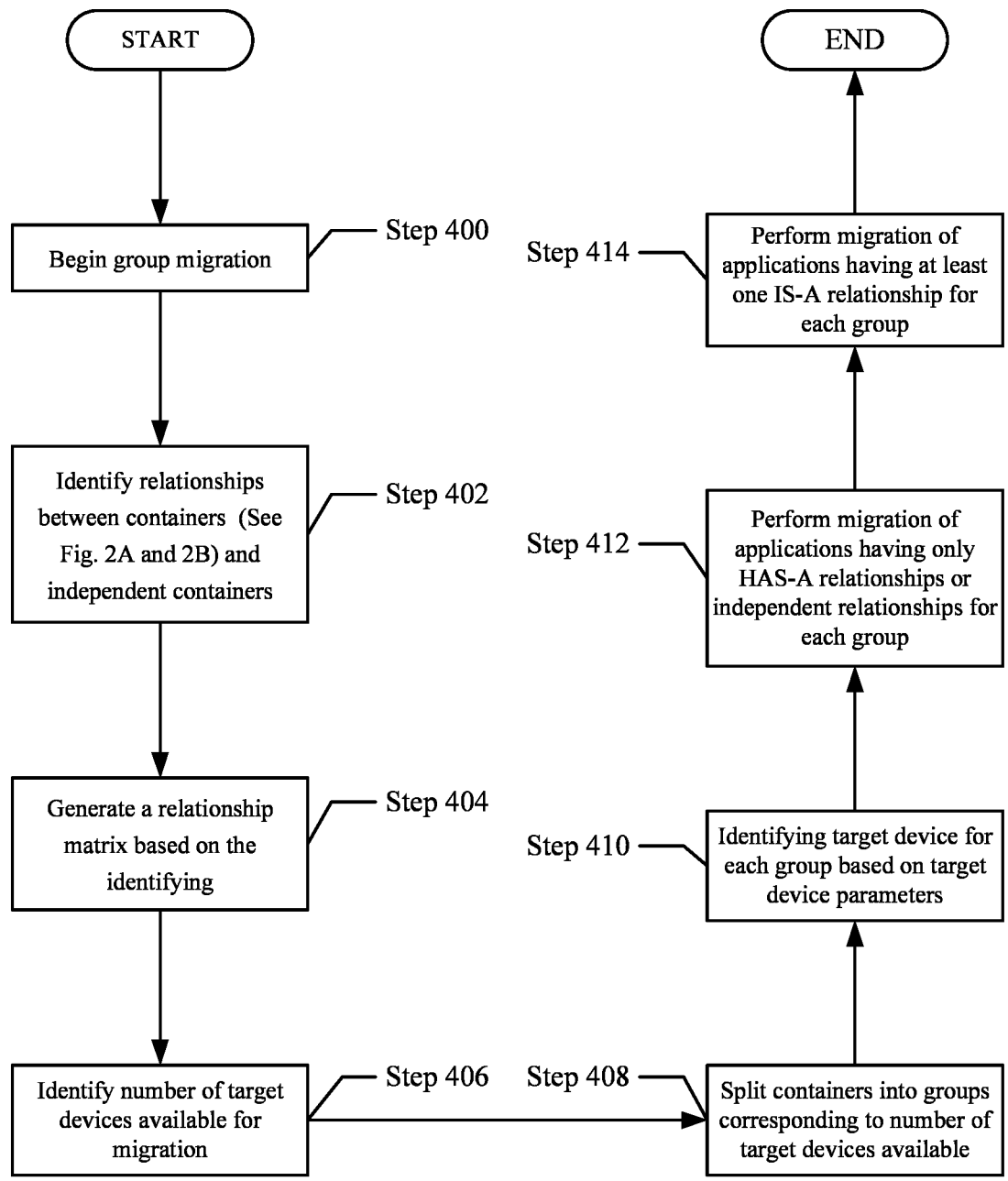
FIG. 4 shows a flowchart of a method to migrate groups of containers in accordance with one or more embodiments of the invention.

FIG. 4 shows a flowchart describing a method for migrating a group of containers from a first device to a second device in accordance with one or more embodiments disclosed herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 4 shows a flowchart of a method for migrating a group of containers, in accordance with one or more embodiments of the invention. The method may be performed by, for example, the duplicator (102, FIG. 1B) and/or any other part of either the source device (100, FIG. 1A) or target device (104, FIG. 1A). Other components of the system illustrated in FIGS. 1A-1C may perform all, or a portion of the method of FIG. 4 without departing from the invention.

In Step 400, the method begins by initiating a migration of a group of containers. As discussed above, a device may include a number of containers. At some point, a request may be received to migrate a portion of the containers on the device to a second device(s).

In step 402, the method identifies the relationships between the containers, as discussed in more detail in FIGS. 2A-2B. The methods above identify if at least two containers have a relationship and create the relationship types of HAS-A or IS-A relationships.

In step 404, the container relationship analyzer uses this identification of the relationships between the at least two containers to produce a matrix for each container showing its relationship to other containers. Step 404 is substantially similar to step 302 described above.

In Step 406, the method identifies the number of target devices available for migration. Then, in Step 408, the method splits the containers into groups based on the number of target devices identified as available in Step 406. The containers may be formed into any number of groups, but there needs to be a target device to which each group is migrated. For example, if there are two target devices available, then the containers to be migrated may be split into two groups. However, there may be a limit on the number of groups into which the containers may be split.

In one embodiment, the grouping of the containers may be based on their dependencies. Containers that are dependent on another container (i.e., containers with an IS-A relationship) must be grouped with the containers on which they are dependent. As such, the number of groups that the containers may be split into is finite and based on the relationships between the containers. In one or more embodiments, the number of target devices available may exceed the number of possible groups. In this embodiment, the containers may be split into the maximum number of groups possible.

In one embodiment, the grouping of the containers may be based on parameters related to the containers. The parameters may include the number of open ports, the connection reliability, network version (i.e., IPV4 or IPV6), network traffic, workload required by each container, workload available on each target device, priority of applications running on the containers, or any other parameter that may be affected by the use of containers on a device. For example, a first group of containers may need the IPV4 network version while another group may need the IPV6 network version.

In Step 410, the method identifies a target device for each group based on one or more parameters of the target device and the containers. In one or more embodiments, the parameters may include the number of open ports, the connection reliability, network version (i.e., IPV4 or IPV6), network traffic, workload required by each container, workload available on each target device, priority of applications running on the containers, or any other parameter that may be affected by the use of containers on a device. For example, a first group of containers may need the IPV4 network version and would thus be mapped to a target device that also communicated via IPV4.

In Step 412, the method performs migration of containers having only HAS-A relationships or independent relationships for each group.

In Step 414, the method performs migration of containers having at least one IS-A relationship for each group. In one embodiment, Steps 412 and 414 may be performed group by group (i.e., perform Step 412 then 414 for a first group, and then repeat for each subsequent group). In one embodiment, Step 412 may be performed for all groups and then Step 414 may be performed after all containers having only HAS-A relationships or independent relationships have been migrated to their respective target devices.

Once Step 414 is complete, the method may end.

Example

Figure 5:
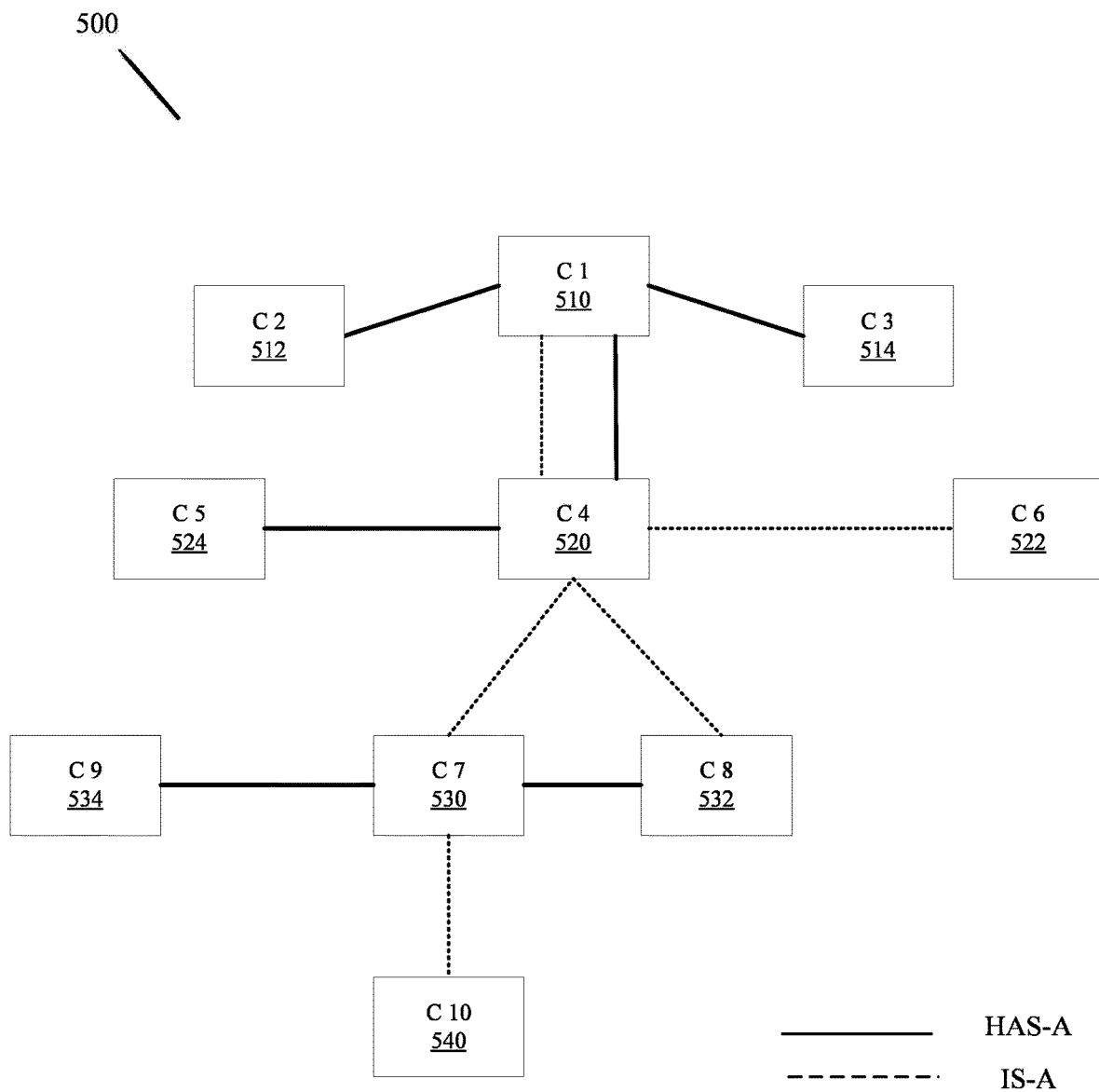
FIG. 5 shows an example of a relationship tree in accordance with one or more embodiments of the invention.

FIG. 5 shows an example of a relationship tree (500) in order to better describe the relationships between multiple containers and the order, according to the methods of FIGS. 2A-4, that containers in an exemplary source device (e.g., 100, FIG. 1A), in accordance with one or more embodiments of the invention, are duplicated. While the example is shown as a relationship tree for easier understanding, other methods of organizing the applications can be used such as a table, and/or relationship matrix. The tree includes ten containers (510-540) with either a HAS-A, IS-A, or both relationships with other containers. More or less containers can be mapped in this manner and the number of containers is only dependent on the number of containers that the duplication described in the method of FIGS. 3 and 4 is specified to be performed as specified by either a user, administrator, or other components of the duplicator (e.g., 102, FIG. 1A).

The first container (510) has three HAS-A relationships, one with the second container (512), one with the third container (514) and one with the fourth container (520). The first container (510) also has an IS-A relationship with the fourth container (520). Accordingly, the first container (410) and the fourth container (520) have a parent-child relationship. The fourth container (520) additionally has a HAS-A relationship with the fifth container (524) and IS-A relationships with the sixth (522), seventh (530), and eighth containers (532). The seventh (530) and eighth containers (532) have a HAS-A relationship with each other and the seventh container (530) also has a HAS-A relationship with the ninth container (534) and an IS-A relationship with the tenth container (540).

When performing the duplication (which may correspond to creating twin containers or migrating containers), as described in more detail with regards to FIGS. 2A-4, the container relationship analyzer (e.g., 120, FIG. 1B) determines the above relationships. The duplicator (e.g., 102, FIG. 1A) then duplicates the containers, in accordance with one or more embodiments of the invention. The second (512), third (514), fifth (524), and ninth (534) containers are duplicated first as they have only HAS-A relationships. Then the containers with at least one IS-A relationship are duplicated with the child container being duplicated after the parent container is duplicated and started successfully. Accordingly, the first container (510) is then duplicated and successfully started followed by the fourth container (520), which is followed by the sixth (522), seventh (530), and eighth (532) containers. Finally, once all other containers have successfully started, the tenth container (440) is duplicated.

Other orders of duplicating can be considered in accordance with one or more embodiments of the invention based on criteria specified by a user or administrator as well as other components of the duplicator (e.g., 102 of FIG. 1A) in addition to the order specified in the methods of FIGS. 2A-4. FIG. 5, is intended as an example only.

End Example

Figure 6:
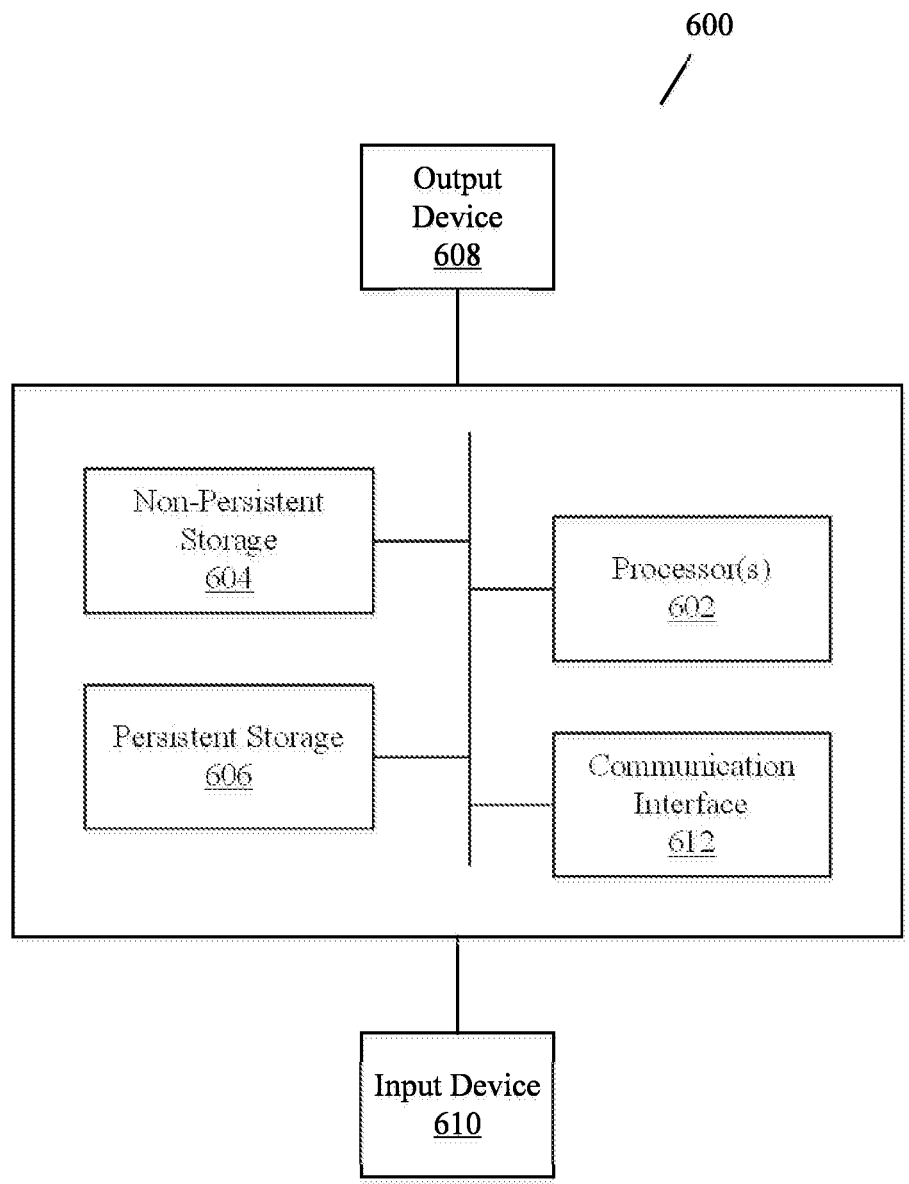
FIG. 6 shows a computing system in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described above relate to methods, systems, and non-transitory computer readable mediums storing instructions for creating and executing duplication workflows to twin or migrate data from one device or set of devices to another device or set of devices (e.g., from one computing environment to another). In one or more embodiments, duplications involve obtaining relationship information with regards to the containers that will be duplicated from one device to another device or set of devices.

The methods, systems, and instructions, described above, during a duplication, assign a priority to each container to be duplicated based on its relationships with other containers. The containers are classified based on their relationships such as HAS-A (two or more containers have a correlated relationship with each other or are a parent container) and IS-A (two or more containers have a dependency relationship, such as being a child container to a corresponding parent container.) Based on these classifications, one or more embodiments of the invention generate a relationship matrix in order to assign priority to the duplication of each individual container. The containers are then duplicated based on the matrix and assigned priorities.

This approach attempts to prevent a container being duplicated without a container on which it is dependent. By performing the above-described methods, systems, and instructions, breaking of dependency between containers during duplication can be minimized. The method, systems, and instruction described above, attempt to assure that the duplication will be successful with minimal interruption to the user.

The problems discussed above should be understood as being examples of problems solved by embodiments of the invention, and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing containers, the method comprising:

identifying relationships between containers on a first device, wherein each container of the containers comprises at least one relationship, wherein the relationship comprises a HAS-A relationship or an IS-A relationship;

creating, on a second device, a first set of twin containers, wherein each container in the first set of twin containers corresponds to a container that comprises only the HAS-A relationships;

creating, on the second device and in response to creating the first set of twin containers, a second set of twin containers, wherein each container in the second set of twin containers corresponds to a container that comprises at least one IS-A relationship;

determining a twin container start-up sequence for the first set and the second set of twin containers; and performing the twin container start-up sequence by:

performing a first migration of only the first set of twin containers wherein each container in the first set of twin containers corresponds to a container that comprises only the HAS-A relationship; and performing a second migration, after completion of the first migration, of the second set of twin containers wherein each container in the second set of twin containers corresponds to a container that comprises at least one IS-A relationship.

2. The method of claim 1, wherein determining the relationships further comprises:
identifying a communication between a first container and a second container;
determining that the first container is receiving information and the second container is sending information; and
assigning, based on the determining, a parent-child relationship between the first container and the second container, wherein the first container comprises the HAS-A relationship and the second container comprises the IS-A relationship.

3. The method of claim 2, wherein the determining that the first container is receiving information and the second container is sending information is based on metadata corresponding to port mapping.

4. The method of claim 2, wherein the determining that the first container is receiving information and the second container is sending information is based on traffic between the first container and the second container.

5. The method of claim 1, wherein determining the relationships further comprises:
determining that a third container and a fourth container are utilizing a common data copy; and
assigning the HAS-A relationship between the third container and the fourth container.

6. The method of claim 1, further comprising generating a relationship matrix based on the relationships.

7. The method of claim 6, wherein the determining and performing the twin container start-up sequence is based on the relationship matrix.

8. The method of claim 1, further comprising:
waiting a predefined time between performing the twin container start-up sequence for each of the containers of the first set of twin containers.

9. A non-transitory computer readable medium comprising computer readable program code, which when executed by a computer processor enables the computer processor to perform a method for managing containers, the method comprising:
identifying relationships between containers on a first device, wherein each container of the containers comprises at least one relationship, wherein the relationship comprises a HAS-A relationship or an IS-A relationship;
creating, on a second device, a first set of twin containers, wherein each container in the first set of twin containers corresponds to a container that comprises only the HAS-A relationships;
creating, on the second device and in response to creating the first set of twin containers, a second set of twin containers, wherein each container in the second set of twin containers corresponds to a container that comprises at least one IS-A relationship;
determining a twin container start-up sequence for the first set and the second set of twin containers; and
performing the twin container start-up sequence by:
performing a first migration of only the first set of twin containers wherein each container in the first set of twin containers corresponds to a container that comprises only the HAS-A relationship; and
performing a second migration, after completion of the first migration, of the second set of twin containers wherein each container in the second set of twin containers corresponds to a container that comprises at least one IS-A relationship.

10. The non-transitory computer readable medium of claim 9, wherein the method further comprises:
identifying a communication between a first container and a second container;
determining that the first container is receiving information and the second container is sending information; and
assigning, based on the determining, a parent-child relationship between the first container and the second container, wherein the first container comprises the HAS-A relationship and the second container comprises the IS-A relationship.

11. The non-transitory computer readable medium of claim 10, wherein the determining that the first container is receiving information and the second container is sending information is based on metadata corresponding to port mapping.

12. The non-transitory computer readable medium of claim 10, wherein the determining that the first container is receiving information and the second container is sending information is based on traffic between the first container and the second container.

13. The non-transitory computer readable medium of claim 9, wherein determining the relationships further comprises:
determining that a third container and a fourth container are utilizing a common data copy;
assigning the HAS-A relationship between the third container and the fourth container.

14. The non-transitory computer readable medium of claim 9, further comprising:
generating a relationship matrix based on the relationships.

15. The non-transitory computer readable medium of claim 14, wherein the determining and performing the twin container start-up sequence is based on the relationship matrix.

16. The non-transitory computer readable medium of claim 9, further comprising waiting a predefined time between performing the twin container start-up sequence for each of the containers of the first set of containers.

17. A method for managing containers, the method comprising:
identifying relationships between containers on a first device, wherein each container of the containers comprises at least one relationship, wherein the relationship comprises a HAS-A relationship or an IS-A relationship;
generating a relationship matrix based on the relationships;
creating, on a second device, a first set of twin containers and a second set of twin containers corresponding to the containers on the first device;
determining a twin container start-up sequence for the first set and the second set of twin containers; and
performing the twin container start-up sequence by:
performing a first migration of only a first set of twin containers wherein each container in the first set of twin containers corresponds to a container that comprises only the HAS-A relationship; and
performing a second migration, after completion of the first migration, of a second set of twin containers wherein each container in the second set of twin containers corresponds to a container that comprises at least one IS-A relationship.

18. The method of claim 17, wherein the set of twin containers comprises a first set of twin containers and a second set of twin containers, wherein creating the set of twin containers comprises:
- creating, on the second device, the first set of twin containers; and
- creating, on the second device and in response to creating the first set of twin containers, the second set of twin containers.

19. The method of claim 17, wherein identifying relationships between containers on the first device comprises:
- identifying a communication between a first container and a second container, wherein the containers comprise the first container and the second container;
- determining that the first container is receiving information and the second container is sending information; and
- assigning, based on the determining, a parent-child relationship between the first container and the second container, wherein the first container comprises the HAS-A relationship and the second container comprises the IS-A relationship.

20. The method of claim 19, wherein the determining that the first container is receiving information and the second container is sending information is based on metadata corresponding to port mapping or traffic between the first container and the second container.

* * * * *